2

3,184,438
POLYAMIDES OF ISOCYANURATE COMPOUNDS
Lee V. Phillips and William C. Francis, both of Overland Park, Kans., assignors, by mesne assignments, to Gulf Oil Corporation, Pittsburgh, Pa., a corporation of Pennsylvania
No Drawing. Filed Oct. 12, 1961, Ser. No. 144,587
9 Claims. (Cl. 260—78)

This invention relates to novel chemical compounds and processes of preparing the same. More particularly, this invention is concerned with novel derivatives of isocyanuric acid and methods of producing them.

This application is a continuation-in-part of our co-pending application Serial No. 6370, filed February 3, 1960.

According to the present invention there is provided the novel compound tri-(beta-carboxyethyl)isocyanurate of the formula

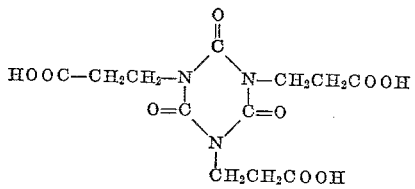

processes of producing the same, and a novel intermediate useful in such processes. There are also provided by this invention novel resinous polyamide materials formed from tri-(beta-carboxyethyl)isocyanurate and organic diamines, and polyesters formed from tri-(beta-carboxyethyl)isocyanurate and polyhydric alcohols as well as such polyesters modified by carboxy acids.

Tri-(beta-carboxyethyl)-isocyanurate can be prepared by reacting cyanuric acid with acrylonitrile to form tri-(beta-cyanoethyl)isocyanurate which can be hydrolyzed to give tri-(beta-carboxyethyl) isocyanurate. This process can be represented as follows:

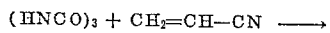
(HNCO)₃ + CH₂=CH—CN ⟶

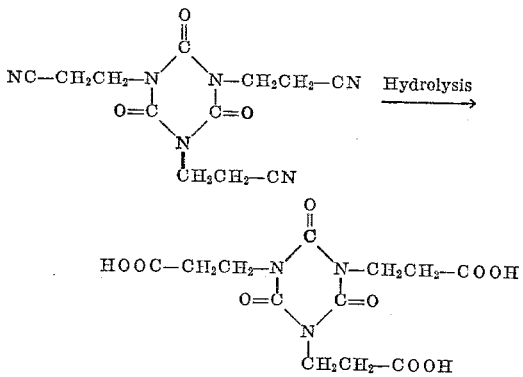

The reaction of cyanuric acid with acrylonitrile can be readily effected by bringing the reactants together in an inert liquid reaction medium and at an elevated temperature. The medium employed preferably should have sufficient solubility for the reactants to facilitate the cyanoethylation reaction. Polar, non-protonic solvents, such as dimethylformamide, are particularly useful. Elevated temperatures such as from about 50° C. to 200° C. can be used for the process. The reflux temperature is preferred since it permits convenient temperature control. The reaction time is not narrowly critical, and may vary from about 5 to 40 hours depending on the reaction medium and temperature employed.

The reaction of cyanuric acid with acrylonitrile is advisably catalyzed with a strong base. Some strong bases which can be used are the alkali metal hydroxides such as potassium hydroxide and sodium hydroxide, and quaternary ammonium hydroxides such as benzyltrimethylammonium hydroxide, sold under the trade name "Triton B."

After the reaction is terminated the product can be recovered by distilling the reaction mixture under reduced pressure to give a residue of crude product. Alternatively, the reaction mixture can be cooled to crystallize out the product which can be recovered by filtration. The solid product can be recrystallized from acetonitrile, acetic acid and dioxane.

Hydrolysis of tri-(beta-cyanoethyl)isocyanurate yields tri-(beta-carboxyethyl)isocyanurate. The hydrolysis is readily effected in the presence of mineral acid as a catalyst. Hydrochloric acid is particularly suitable as the hydrolysis catalyst since it is easily removed after the hydrolysis is terminated. Acetic acid is also advisably employed, particularly in combination with mineral acids and especially hydrochloric acid, since it functions as a solubilizing agent for tri-(beta-cyanoethyl)isocyanurate. Elevated temperatures such as the reflux temperature are generally used to promote the hydrolysis and bring it to completion in a minimum of time. About 1 to 10 hours are usually adequate for the hydrolysis. After the hydrolysis is terminated the product can be recovered from the reaction mixture by conventional means such as distillation under reduced pressure to a solid residue which can be recrystallized from water.

The resulting tri-(beta-carboxyethyl)isocyanurate forms salts with organic diamines and such salts, upon the application of heat, are converted to resinous materials. Some of the diamines which form salts with tri-(beta-carboxyethyl)isocyanurate are the aliphatic diamines having alpha, omega-diamines such as tetra-, penta-, hexa-, octa-, deca-, and dodeca- methylenediamines although hexamethylenediamine is particularly important because of its availability. However, aromatic containing diamines such as m-xylenediamine and paraphenylenediamine also form salts which can be converted to resins. Similarly, heterocyclic diamines such as piperazine and 2,5-dimethylpiperazine can be used.

The diamine salts of tri-(beta-carboxyethyl)isocyanurate can be prepared by bringing the diamine and tri-(beta-carboxyethyl)isocyanurate together in a suitable liquid reaction medium. Reaction media in which the reactants are soluble, and the resulting product is substantially insoluble, are advisably employed. The selection of such solvents is within the skill of the art.

After the diamine salts of tri-(beta-carboxyethyl)isocyanurate have been formed they can be converted into glassy resinous polymers through the application of heat. The temperature employed for effecting polymerization will depend on the particular salt used. However, temperatures of about 175° C. to 300° C. are suitable for most such salts although higher or lower temperatures may be indicated with some salts. A vacuum can be used to remove water formed during the polymerization.

The polymers formed in this way between tri-(beta-carboxyethyl)isocyanurate and the diamines are herein referred to as polyamides. Of particular importance is the polyamide formed by the condensation of tri-(beta-carboxyethyl)-isocyanurate and hexamethylenediamine.

Polyesters can be formed by condensing tri-(beta-carboxyethyl)isocyanurate with a polyhydric alcohol, or a polyhydric alcohol partially esterified with a carboxy acid, by heating a mixture of the reactants at an elevated temperature.

Some polyhydric alcohols which form polyesters with tri-(beta-carboxyethyl)isocyanurate with ethylene glycol, diethylene glycol, alpha-propylene glycol, decamethylene glycol, glycerol and pentaerythritol.

The polyhydric alcohols can be partially esterified with acids such as oleic, linoleic, ricinoleic, malonic, succinic and adipic and such polyesters condensed with tri-(beta-carboxyethyl) isocyanurate. Alternatively, a polyhydric alcohol, a carboxy acid and tri-(beta-carboxyethyl)isocyanurate can be brought together in unreacted form to form a polyester of these materials. The composition and properties of the resinous polyester formed will vary with the quantities of each reactant used.

The following examples are presented to illustrate the invention.

EXAMPLE 1

Tri-(beta-cyanoethyl)isocyanurate

A mixture of 20 g. (0.155 mole) of cyanuric acid, 49.3 g. (0.93 mole) of freshly distilled acrylonitrile and 1.5 g. of 40% Triton B was stirred and heated at reflux in 50 ml. of dimethylformamide for 38 hours. During this time the pot temperature rose from 90° C. to 105° C. The mixture was cooled to about room temperature and acidified with 4 ml. of 3 N hydrochloric acid. The mixture was distilled under reduced pressure (water aspirator) to remove the solvent and excess acrylonitrile. The solid residue was slurried with 200 ml. of boiling water which was then cooled to room temperature and allowed to stand overnight. Filtration gave 41.9 g. of crude product that melted at 223-224° C. Recrystallization from acetonitrile gave the pure product melting at 224-225° C. and having the analysis:

Calculated for $C_{12}H_{12}N_6O_3$: C, 50.0; H, 4.2; N, 29.2. Found: C, 50.2; H, 4.4; N, 29.2.

It is slightly soluble in ether, water and ethanol and has little solubility in methanol, ligroin, hexane, benzene, chloroform, methylene chloride, toluene, ethylene dichloride and ethyl acetate.

EXAMPLE 2

Tri-(beta-carboxyethyl)isocyanurate

Tri-(beta-cyanoethyl)isocyanurate (7 g.) was added to 55 ml. of concentrated hydrocloric acid and 10 ml. of acetic acid. The mixture was stirred at reflux temperature for 5 hours. Soon after the mixture began refluxing all material went into solution. The mixture was distilled under reduced pressure (water aspirator) to leave a residue of crude product which was recrystallized from water to give 7.2 g. (87% yield) of white, crystalline product melting at 224-226° C. Further recrystallization from water raised the melting point to 226-227° C.

Calculated for $C_{12}H_{15}N_3O_9$: C, 41.7; H, 4.4; N, 12.2. Neutralization equivalent 115.1. Found: C, 41.7; H, 4.3; N, 12.5. Neutralization equivalent 115.1.

EXAMPLE 3

Tri-(beta-carboxyethyl)isocyanurate-hexamethylenediamine salt

Tri-(beta-carboxymethyl)isocyanurate (52 g.) was dissolved in 250 ml. of warm methanol and to this was added 19 g. of hexamethylenediamine dissolved in 150 ml. of acetone. The salt precipitated and after standing briefly at room temperature was isolated by filtration and washed with acetone to give 62 g. Recrystallization from a methanol-water mixture gave 58 g. of salt melting at 204-206° C.

EXAMPLE 4

Polymerization of tri-(beta-carboxyethyl)isocyanurate-hexamethylenediamine salt The salt was sealed in a Pyrex tube under vacuum and heated at 230° C. for 30 minutes. After cooling in Dry Ice, the tube was opened and connected to a vacuum pump. The reaction product was then heated again at 180°-190° C. under vacuum for 4 hours. The polymer was removed from the tube and was found to be a hard, clear, glassy polymer with a slight yellow color and a softening range of 85-100° C.

EXAMPLE 5

Preparation of modified tri-(beta-carboxyethyl)isocyanurate-propylene glycol polyester A mixture of tri-(beta-carboxyethyl)isocyanurate (103.5 g.; 0.3 mole), adipic acid (14.1 g.; 0.1 mole), and propylene glycol (53.4 g.; 0.7 mole) was heated, with stirring, at 170-180° C. for three hours under an atmosphere of nitrogen. The resulting clear, colorless, resinous product (142.4 g.) had an acid number of 50 and a softening point of approximately 100° C. The resin is soluble in acetone and slightly soluble in benzene, ethanol, butanol and methyl isobutyl ketone. It is insoluble in water, xylene, diethyl ether, petroleum ether and ligroin.

The resin formed a clear, colorless film using acetone as a vehicle. The film was baked 25 minutes at 200° C. It had a Sward hardness of 24 (see H. F. Payne, "Organic Coating Compositions," vol. I, p. 642-643, John Wiley (1954)) for a description of the Sward hardness test and apparatus.

EXAMPLE 6

Preparation of tri-(beta-carboxyethyl)isocyanurate-piperazine polyamide

Tri-(beta-carboxyethyl)isocyanurate (3.45 g.; 0.01 mole) was dissolved in a small amount of warm methanol in a test tube and a solution of 1.29 g. (0.015 mole) of piperazine in methanol was added. Crystallization of the salt occurred immediately. The solvent was removed by evaporation at reduced pressure and the salt residue then heated at 200-225° C. at 1 mm. pressure for 5 hours. The resulting polyamide was a light-yellow, brittle material with a softening range of 250-280° C.

EXAMPLE 7

Tri-(beta-carboxyethyl)isocyanurate-p-phenylenediamine polyamide

Following the procedure of Example 6, 1.73 g. (0.005 mole) of tri(beta-carboxyethyl)isocyanurate and 0.81 g. (0.0075 mole) of p-phenylenediamine gave a dark, porous, brittle polyamide which softened at 240-270° C.

EXAMPLE 8

Tri-(beta-carboxyethyl)isocyanurate-piperazine polyamide modified with morpholine Following the general procedure of Example 6, 1.73 g. (0.005 mole) of tri(beta-carboxyethyl)isocyanurate, 0.43 g. (0.005 mole) of piperazine and 0.44 g. (0.005 mole) of morpholine gave a light-yellow, hard, glassy polyamide with a softening range of 195-210° C.

EXAMPLE 9

Tri-(beta-carboxyethyl)isocyanurate-p-phenylenediamine polyamide modified with morpholine Following the general procedure of Example 6, 1.73 g. (0.005 mole) of tri(beta-carboxyethyl)isocyanurate, 0.54 g. (0.005 mole) of p-phenylenediamine and 0.44 g. (0.005 mole) of morpholine gave a dark, hard, glassy polyamide with a softening range of 110-140° C.

Various changes and modifications of the invention can be made and, to the extent that such variations incorporate the spirit of this invention, they are intended to be included within the scope of the appended claims.

What is claimed is:

1. An organic diamine salt of tri-(beta-carboxyethyl)-isocyanurate, said organic diamine being selected from the group consisting of aliphatic diamines, monocyclic aromatic diamines, and monocyclic heterocyclic diamines.

2. A polymethylenediamine salt of tri-(beta-carboxyethyl)isocyanurate, said polymethylenediamine having 4 to 12 carbon atoms.

3. The salt of hexamethylenediamine and tri-(beta-carboxyethyl)isocyanurate.

4. A polyamide of an organic diamine with tri-(beta-carboxyethyl)isocyanurate, said organic diamine being selected from the group consisting of aliphatic diamines, monocyclic aromatic diamines, and monocyclic heterocyclic diamines.

5. A polyamide of a polymethylenediamine with tri-(beta-carboxyethyl)isocyanurate, said polymethylenediamine being 4 to 12 carbons.

6. A polyamide of hexamethylenediamine with tri-(beta-carboxyethyl)isocyanurate.

7. The process which comprises forming a salt of an organic diamine selected from the group consisting of aliphatic diamines, monocyclic aromatic diamines, and monocyclic heterocyclic diamines with tri-(beta-carboxyethyl)isocyanurate and heating the salt to an elevated temperature within the range of about 175–300° C. to polymerize the same.

8. The process which comprises forming a salt of a polymethylene diamine of 4 to 12 carbons with tri-(beta-carboxyethyl)isocyanurate and heating the salt to an elevated temperature within the range of about 175–300° C. to polymerize the same.

9. The process which comprises forming a salt of hexamethylenediamine with tri-(beta-carboxyethyl)isocyanurate and heating the salt to an elevated temperature within the range of about 175–300° C. to polymerize the same.

References Cited by the Examiner

UNITED STATES PATENTS 2,274,831   3/42   Hill _____ 260—78

OTHER REFERENCES

Frazier et al.: Jour. Original Chem., vol. 25 (1960), pages 1944–46.

WILLIAM H. SHORT, *Primary Examiner.*

H. N. BURSTEIN, *Examiner.*